UNITED STATES PATENT OFFICE.

JAMES CLARK, OF NEWARK, NEW JERSEY.

IMPROVEMENT IN MANUFACTURE OF PRUSSIAN BLUE.

Specification forming part of Letters Patent No. 28,651, dated June 12, 1860.

*To all whom it may concern:*

Be it known that I, JAMES CLARK, of the city of Newark, in the county of Essex and State of New Jersey, have discovered an Improvement in the Manufacture of Prussian Blue; and I do hereby declare the following to be an exact description of the same.

The nature of the improvement consists in furnishing by artificial means the oxygen which is essential to the color of the precipitate, in place of the usual method of agitation, to assist absorption of the oxygen from the atmosphere.

Forcing a distributed current of air through the combined solution of the sesquicyanide and protoxide from which precipitation takes place facilitates the action of the basic oxide and changes the color from its pale-green tint to a deep blue as much in one hour as would take many days to effect in the usual mode of agitation in the atmosphere.

The means and ways of forcing air through liquids are many. A coil of perforated pipes immersed in the liquor, with a force-pump at its outer end, is found to answer the purpose, as also do plain pipes with their ends near the bottom of the tank open to allow the passage of the air from the force-pump. A false bottom to a tank, with numerous small openings covered with valves, the air being forced between the bottoms finds its way up through the liquor. Though this way requires the most power, it is very effectual. There being a variety of ways of forcing air through liquids, I do not claim any particular manner; but

What I claim as my improvement, and desire to secure, is—

Supplying atmospheric oxygen by artificial means in manufacturing Prussian blue, in the manner and for the purposes hereinabove specified.

JAMES CLARK.

Witnesses:
    WM. M. GOODING,
    J. H. POWERS.